(12) United States Patent
Aluru et al.

(10) Patent No.: US 12,243,326 B2
(45) Date of Patent: Mar. 4, 2025

(54) METHODS AND SYSTEM FOR CONTROLLING A VEHICLE USING FUSION OF MULTI_MODALITY PERCEPTION DATA

(71) Applicant: GM GLOBAL TECHNOLOGY OPERATIONS LLC, Detroit, MI (US)

(72) Inventors: Sai Vishnu Aluru, Commerce Township, MI (US); Steffen Peter Lindenthal, Oshawa (CA); Brian Yousif-Dickow, Farmington Hills, MI (US); Ali Atriss, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 363 days.

(21) Appl. No.: 17/812,287

(22) Filed: Jul. 13, 2022

(65) Prior Publication Data

US 2024/0020987 A1    Jan. 18, 2024

(51) Int. Cl.
*G06K 9/00* (2022.01)
*B60W 40/10* (2012.01)
*G06F 18/25* (2023.01)
*G06V 20/58* (2022.01)

(52) U.S. Cl.
CPC ............. *G06V 20/58* (2022.01); *B60W 40/10* (2013.01); *G06F 18/25* (2023.01); *B60W 2420/403* (2013.01); *B60W 2420/408* (2024.01); *B60W 2510/18* (2013.01); *B60W 2510/20* (2013.01); *B60W 2554/4049* (2020.02)

(58) Field of Classification Search
CPC ........ G06V 20/58; G06V 10/24; G06V 10/82; G06V 20/56; G06V 10/803; B60W 40/10; B60W 2420/403; B60W 2420/408; B60W 2510/18; B60W 2510/20; B60W 2554/4049; G06F 18/25
See application file for complete search history.

(56) References Cited

U.S. PATENT DOCUMENTS

| 11,675,068 B2* | 6/2023 | Jiang | G06F 18/214 |
| | | | 382/219 |
| 2019/0375422 A1* | 12/2019 | Shtrom | G01S 13/931 |
| 2021/0263525 A1* | 8/2021 | Das | G06N 3/084 |
| 2021/0342648 A1* | 11/2021 | Richards | H04N 23/11 |

* cited by examiner

Primary Examiner — Xin Jia
(74) Attorney, Agent, or Firm — Lorenz & Kopf, LLP (57) ABSTRACT

Systems and methods for controlling a vehicle are provided. The systems and methods receive a frame of visible image data from at least one camera of the vehicle and a frame of invisible perception data from a perception sensor. The systems and methods fuse the frame of invisible perception data and the frame of visible image data to provide a fused frame of perception data. Object detection, classification and tracking are performed using a neural network based on the fused frame of perception data to provide object detection data. Steering, propulsion and/or braking of the vehicle are controlled based on the object detection data.

20 Claims, 5 Drawing Sheets

METHODS AND SYSTEM FOR CONTROLLING A VEHICLE USING FUSION OF MULTI_MODALITY PERCEPTION DATA

INTRODUCTION

The present disclosure generally relates to vehicles, and more particularly relates to systems and methods for controlling automated features of a vehicle using perception data.

An autonomous vehicle is a vehicle that is capable of sensing its environment and navigating with little or no user input. An autonomous vehicle senses its environment using sensing devices such as radar, lidar, image sensors, and the like that provide perception data. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some existing systems take perception data from different sensing modalities and have separate object detection processing pipelines. The object detection results from each pipeline may then be fused to provide an overall perception result that is used in automated control of a function of the vehicle. Such a multi-pipeline architecture may increase processing costs and may also result in some perception data not being useful in detecting and tracking objects due to poor quality of perception data in an entire frame or in certain regions of the frame for a given perception modality.

Accordingly, it is desirable to provide systems and methods that can maintain or increase perception performance and reduce processing complexity when combining perception data from more than one type of perception sensor. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling a vehicle.

In a first aspect, a method of controlling a vehicle is provided. The method includes: receiving, via a processor, a frame of visible image data from a camera of the vehicle; receiving, via the processor, a frame of invisible perception data from a perception sensor; fusing, via the processor, the frame of invisible perception data and the frame of visible image data to provide a fused frame of perception data; performing, via the processor, object detection, classification and tracking using a neural network based on the fused frame of perception data to provide object detection data; and controlling, via the processor, steering, propulsion and/or braking of the vehicle based on the object detection data.

In embodiments, the method includes determining, via the processor, a usability score for the frame of visible image data, and performing, via the processor, the object detection, classification and tracking using the neural network based on the fused frame of perception data when the usability score is less than a predetermined value and based on the frame of visible image data when the usability score is greater than the predetermined value.

In embodiments, the usability score is determined based on one or more of: a repetitive constant change in contrast, a Signal to Noise Ratio (SNR), luminance, and number of edges.

In embodiments, the method includes aligning, via the processor, the frame of invisible perception data and the frame of visible image data to provide aligned frames that are fused into the fused frame of perception data.

In embodiments, aligning, via the processor, includes one or more of: detecting objects in the frame of invisible perception data and in the frame of visible image data and aligning the objects; and detecting edges in the frame of invisible perception data and in the frame of visible image data and aligning the edges.

In embodiments, the frame of invisible perception data is produced by converting a point cloud to a two dimensional frame.

In embodiments, the fused frame of perception data includes part of the frame of visible image data in an upper region and part of the frame of invisible perception data outside of the upper region.

In embodiments, the method includes receiving, via the processor, the frame of invisible perception data from a LiDAR, RADAR or infrared perception sensor.

In embodiment, the method includes receiving, via the processor, the frame of invisible perception data from a first type of perception sensor; receiving, via the processor, a second frame of invisible perception data from another type of perception sensor; and fusing, via the processor, the frame of invisible perception data, the second frame of invisible perception data and the frame of visible image data to provide the fused frame of perception data.

In embodiments, the first type of perception sensor and the second type of perception sensor are selected from a combination of: a short wave infrared perception sensor, a long wave infrared perception sensor, LiDAR and Radar.

In embodiments, the fused frame of perception data includes visible image data in a top region, Radar or LiDAR perception data at lateral regions and infrared perception data in a central region.

In another aspect, a vehicle system for a vehicle is provided. The system includes: a camera; a perception sensor; a processor in operable communication with the camera and the perception sensor. The processor is configured to execute program instructions. The program instructions are configured to cause the processor to: receive a frame of visible image data from the camera; receive a frame of invisible perception data from a perception sensor; fuse the frame of invisible perception data and the frame of visible image data to provide a fused frame of perception data; perform object detection, classification and tracking using a neural network based on the fused frame of perception data to provide object detection data; and control steering, propulsion and/or braking of the vehicle based on the object detection data.

In embodiments, the program instructions are configured to cause the processor to: determine a usability score for the frame of visible image data, and perform the object detection, classification and tracking using the neural network based on the fused frame of perception data when the usability score is less than a predetermined value and based on the frame of visible image data when the usability score is greater than the predetermined value.

In embodiments, the usability score is determined based on one or more of: a repetitive constant change in contrast, a Signal to Noise Ratio (SNR), luminance, and number of edges.

In embodiments, the program instructions are configured to cause the processor to: align the frame of invisible perception data and the frame of visible image data to provide aligned frames that are fused into the fused frame of perception data.

In embodiments, aligning includes or more of: detecting objects in the frame of invisible perception data and in the frame of visible image data and aligning the objects; and detecting edges in the frame of invisible perception data and in the frame of visible image data and aligning the edges.

In embodiments, the frame of invisible perception data is produced by converting a point cloud to a two dimensional frame.

In embodiments, the fused frame of perception data includes part of the frame of visible image data in an upper region and part of the frame of invisible perception data outside of the upper region.

In embodiments, the program instructions are configured to cause the processor to: receive the frame of invisible perception data from a LiDAR, RADAR or infrared perception sensor.

In embodiments, the program instructions are configured to cause the processor to: receive the frame of invisible perception data from a first type of perception sensor; receive a second frame of invisible perception data from another type of perception sensor; and fuse the frame of invisible perception data, the second frame of invisible perception data and the frame of visible image data to provide the fused frame of perception data.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein feed a perception system with only one frame of fused perception data. A combination of frame usability analysis (confidence ratio) is used to fuse the frames from visible and invisible imaging technologies, enabling minimal compute complexity and improved performance of the perception system. A fusion method described herein assesses criterion based on usability of frame (confidence ratio) to decide whether to combine multiple sensor image data into one robust usable frame. Further criterion can include region of interest and key object recognition. The systems and methods described herein use a fusion model to create a new frame from multiple frames for perception. Systems and methods described herein may further create metainformation that describes the areas of the new frame to the perception engine.

Figure 1:
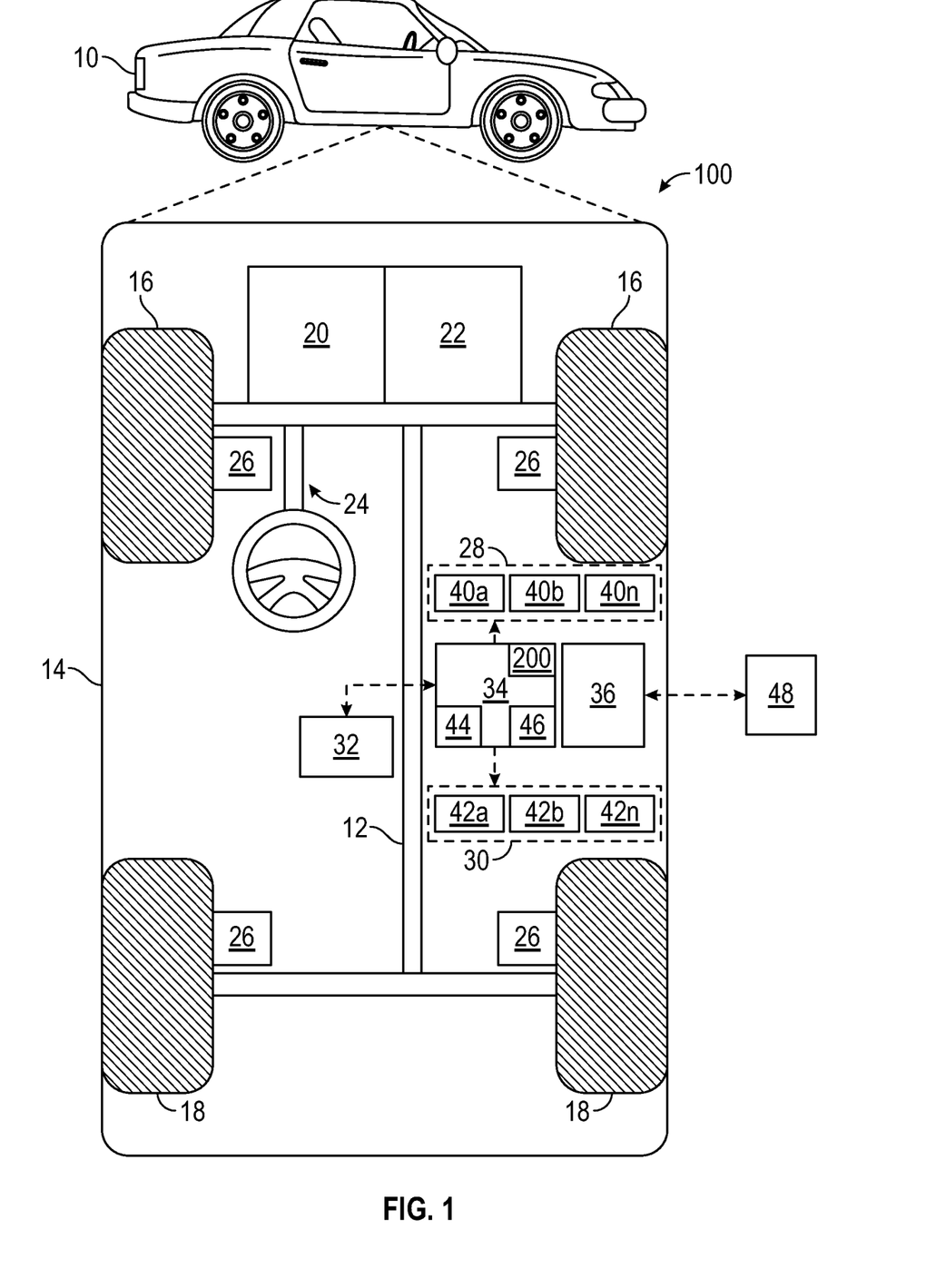
FIG. 1 is a functional block diagram illustrating a vehicle having a fused frame perception system, in accordance with various embodiments.

With reference to FIG. 1, a vehicle system shown generally at 100 is associated with a vehicle 10 in accordance with various embodiments. In general, the vehicle system 100 combines frames of perception data from different types of perception sensors into a fused frame that is used by a trained neural network to detect and classify objects.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the vehicle system 100 is incorporated into the vehicle 10 (hereinafter referred to as the vehicle 10). The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, the vehicle may include lower automation levels corresponding to advanced driver assistance systems that utilize a perception system to decide how to control an automated function of the vehicle 10.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The sensing devices 40a-40n (or perception sensors) will be described in further detail with reference to FIG. 3. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
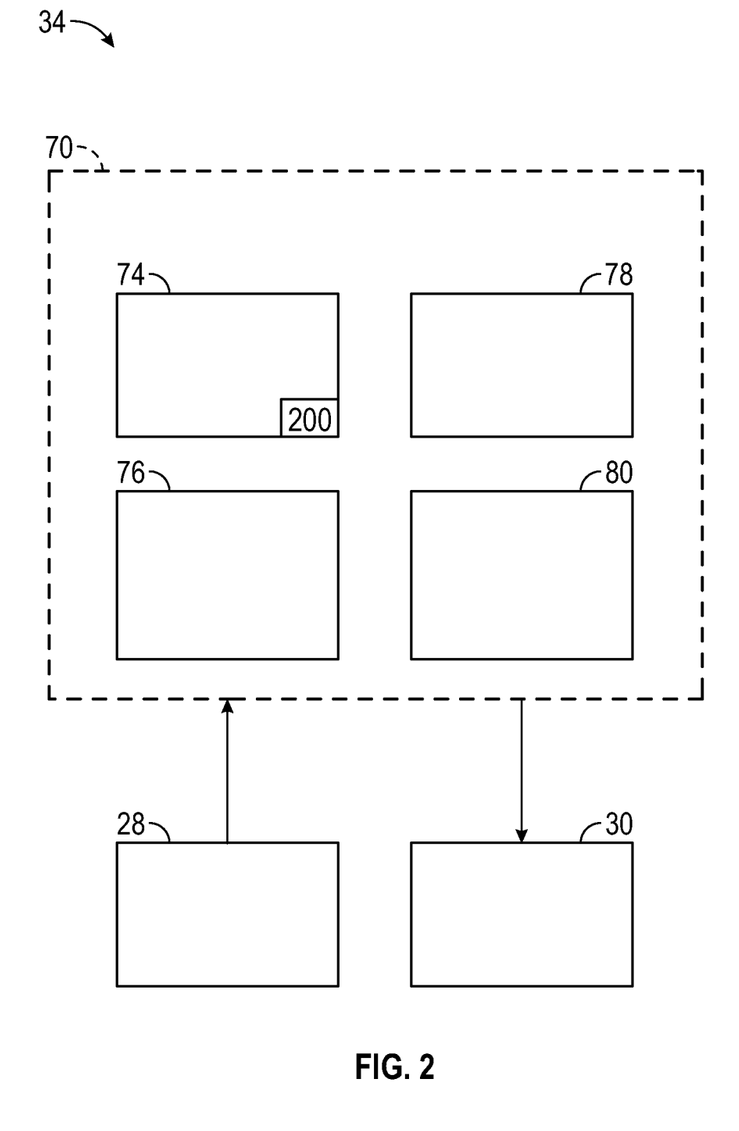
FIG. 2 is a functional block diagram illustrating a an autonomous driving system for a vehicle according to FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the vehicle system 100 and, when executed by the processor 44, use a fusion model to combine frames of perception data from different perception modalities. The fused frames are passed to a trained neural network to perform object detection. Detected objects are used as an input to an automated vehicle control function such as lane centering or object avoidance control.

As can be appreciated, the subject matter disclosed herein provides certain enhanced features and functionality to what may be considered as a standard or baseline vehicle 10. To this end, an autonomous vehicle can be modified, enhanced, or otherwise supplemented to provide the additional features described in more detail below.

Referring now to FIG. 2, and with continued reference to FIG. 1, a dataflow diagram for an Advanced Driver Assistance System (ADAS) or autonomous driving system 70 is illustrated. In accordance with an exemplary driving application, the controller 34 implements the Advanced Driver Assistance System or autonomous driving system 70 as shown in FIG. 2. That is, suitable software and/or hardware components of the controller 34 (e.g., the processor 44 and the computer-readable storage device 46) are utilized to provide ADAS 70 that is used in conjunction with vehicle 10.

In various embodiments, the instructions of the ADAS 70 may be organized by function, module, or system. For example, as shown in FIG. 2, the ADAS 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes sensor data and predicts the presence, location, classification, and/or path of objects and features of the environment of the vehicle 10. Further, the perception system 74 may detect and locate lane markings in the environment of the vehicle 10. In various embodiments, the perception system 74 can incorporate information from multiple sensors, including but not limited to cameras, lidars, radars, and/or any number of other types of sensors. As described further herein with reference to FIG. 3, frames of perception data from multiple sensor modalities are fused into one frame of fused data by the perception system 74.

The positioning system 76 processes sensor data along with other data to determine a position (e.g., a local position relative to a map, an exact position relative to lane of a road, vehicle heading, velocity, etc.) of the vehicle 10 relative to the environment. The path planning system 78 processes sensor data along with other data to determine a path for the vehicle 10 to follow. The path may be generated so as to follow a center of a lane according to a lane keeping system. The path may be generated so as to take into account detected objects from the perception system 74. The vehicle control system 80 generates control signals for controlling the vehicle 10 according to the determined path. The positioning system 76 may process a variety of types of raw localization data in determining a location of the vehicle 10 including Inertial Measurement Unit data, Global Positioning System (GPS) data, Real-Time Kinematic (RTK) correction data, cellular and other wireless data (e.g. 4G, 5G, V2X, etc.), etc.

In various embodiments, the controller 34 implements machine learning techniques to assist the functionality of the controller 34, such as feature detection/classification, obstruction mitigation, route traversal, mapping, sensor integration, ground-truth determination, and the like.

The ADAS or autonomous driving system 70 may generate a vehicle control output that includes a set of actuator commands to achieve a commanded path from the path planning system 78, including, but not limited to, a steering command, a shift command, a throttle command, and a brake command. The vehicle control output is communicated to the actuator system 30. In an exemplary embodiment, the actuators 42 include a steering control, a shifter control, a throttle control, and a brake control. The steering control may, for example, control a steering system 24 as illustrated in FIG. 1. The shifter control may, for example, control a transmission system 22 as illustrated in FIG. 1. The throttle control may, for example, control a propulsion system 20 as illustrated in FIG. 1. The brake control may, for example, control wheel brake system 26 as illustrated in FIG. 1.

Figure 3:
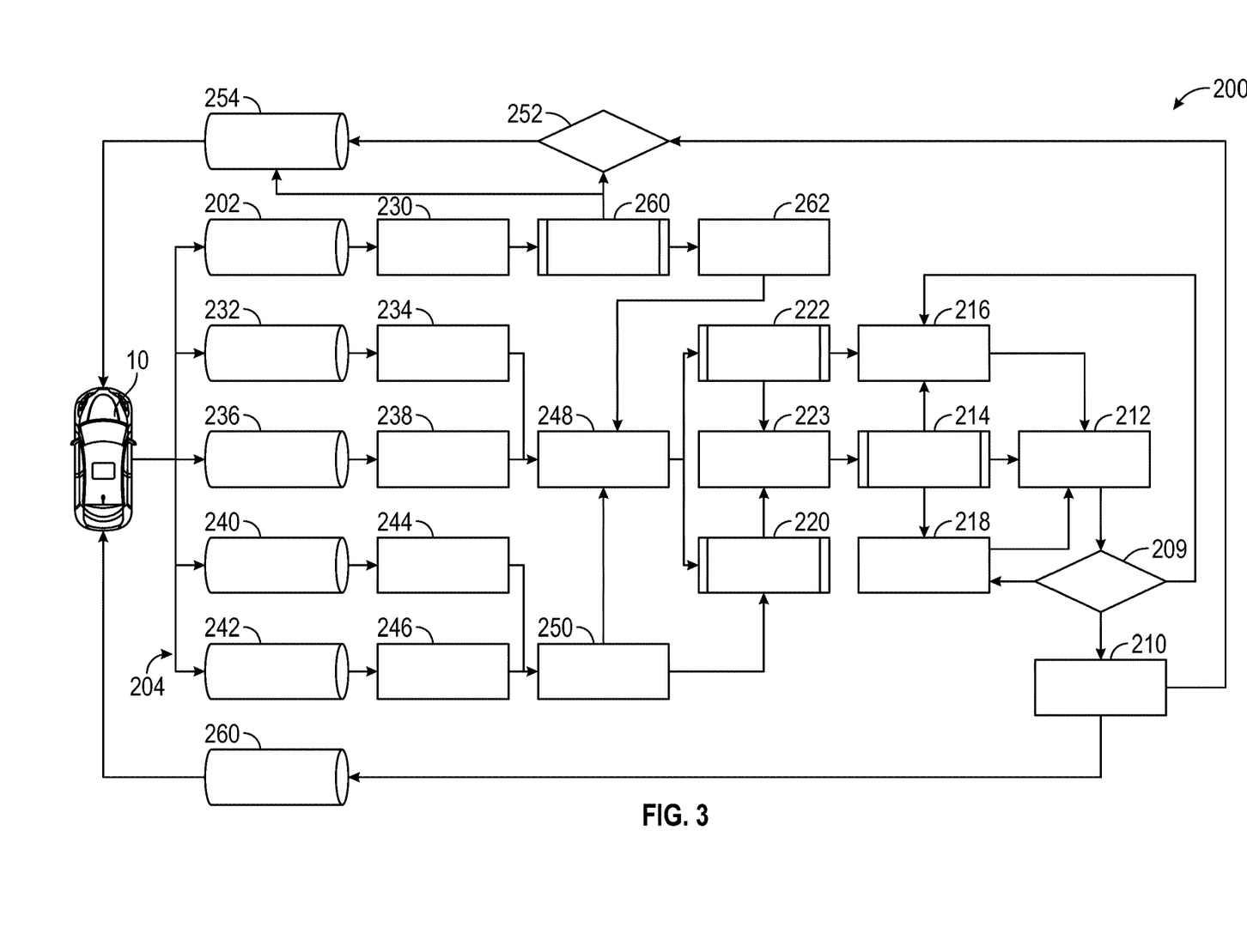
FIG. 3 is a dataflow diagram illustrating a fused frame perception system, in accordance with various embodiments.

As mentioned briefly above, the fused frame perception system 200 of FIG. 1, and with reference to FIG. 3, is included within the ADAS or autonomous driving system 70, for example as part of the perception system 74 such that objects that have been detected by the perception system are used as an input in generating a vehicle control output for the actuator system 30.

Referring to FIG. 3, with continued reference to FIGS. 1 to 2, the fused frame perception system 200 is further illustrated in accordance with exemplary embodiments. The fused frame perception system 200 includes functional modules that are performed by the programming instructions described hereinbefore and other system components.

With regard to FIG. 3 and with continued reference to FIGS. 1 and 2, the fused frame perception system 200 will be further described. The fused frame perception system 200 includes multi-modal perception sensors 204 providing frames of perception data that go through a number of processing pipelines in order to fuse such data. In the exemplary embodiment, the multi-modal perception sensors 204 include a camera 202 providing a visible frame 230 of perception data. The multi-modal perception sensors 204 may include an infrared sensor such as an SWIR (Short Wave InfraRed) sensor 232 and an LWIR (Long Wave InfraRed) sensor 236 providing an SWIR frame 234 of perception data and an LWIR frame 238 of perception data, respectively. The multi-modal perception sensors 204 include a LiDAR sensor 240 and a RADAR sensor 242 providing a LIDAR point cloud 244 of perception data and a RADAR point cloud 246 of perception data, respectively.

The fused frame perception system 200 includes a variety of processing stages to allow the frames of perception data to be place into 2D format, aligned and fused into a final fused frame 210 including perception data from different perception sensors. The visible frame 230 provided by the camera 202 is processed to capture color 260 information. De-Bayer 262 processing is performed to convert the captured color information into RGB color pixel values for each pixel. The resulting RGB visible image is subjected to grayscale conversion 248 in order to provide a grayscale, 2D image frame corresponding to the visible frame 230 captured by the camera 202.

In some embodiments, the color frame that is output from the capture color 260 step is assessed to determine if it is usable 252. That is, is the quality of information in the visible frame sufficient for object detection and tracking to be used without combining with the other data modalities? The assessment of whether the color image frame is usable 252 can be based on one or more of the following parameters: a repetitive constant change in contrast, Signal-to-Noise Ratio (SNR), luminance, and number of edges. The parameters can be used individually or in any combination to determine a usability score for the visible frame. If the usability score is low (e.g. below a predetermined threshold), the other sensor modalities are triggered and the process of fusion begins. If the usability score is sufficiently high, the other sensor modalities may not be processed and may not generate frames of data. That is, the visible frame 230 alone is processed by an object detection and tracking neural network (not shown) to detect and localize objects for use as an input to control the vehicle 10.

When the usability score is determined to be sufficiently high in the usable 252 stage, frames of other modalities of perception data are triggered in that they are captured and processed. The SWIR frame 234 and the LWIR frame 238 are subjected to grayscale conversion 248. It should be appreciated that only one of SWIR frame 234 and LWIR frame 238 may be processed and other types of IR perception data may be similarly processed. Further, one or more of the LIDAR point cloud 244 and the RADAR point cloud 246 are captured subject to 2D conversion 250. The 2D conversion 250 can utilize a camera model and projection processing to project each cloud point onto a 2D image plane. The projected image is then subject to grayscale conversion 248. In this way, grayscale 2D image frames are provided from each multi-modal perception sensor. Since the data is of a common form, it is possible to stitch the frames together in a fusion process. The fusion process, however, requires alignment of the grayscale frames.

One part of the alignment process is to scan for objects 220 and then align the objects between each type of image frame. One exemplary process to scan for objects is to take each grayscale image frame (e.g. from the LIDAR, RADAR, camera and IR multi-modal perception sensors 204) and to perform blob detection. One exemplary process for blob detection is to binarize the grayscale image frame and determine object blobs using a, for example, Laplacian of Glaussian method. The scan for objects 220 step provides detected object blobs in each frame that can provide features for matching. Additionally, the alignment may include a scan for edges 222 step that extracts edges from the grayscale images in each sensing modality. The detected edges and objects allow for feature matched alignment in the multiplexing 223 and overlay edges 216 steps.

Figure 4:
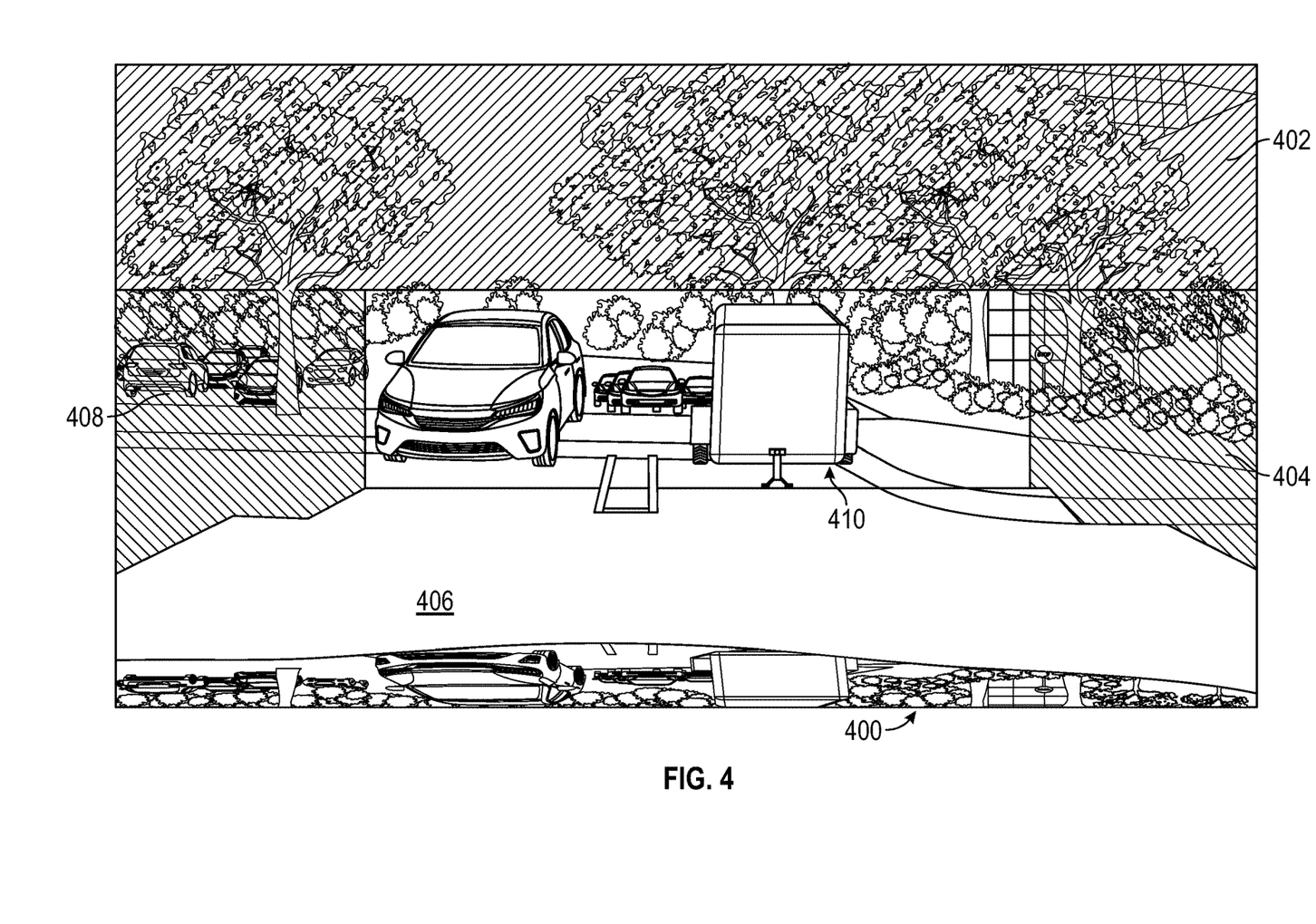
FIG. 4 is an exemplary frame of fused perception data produced by a fusion model used by the fused frame perception system, in accordance with various embodiments.

In this way, spatially aligned frames of perception data are provided and are combined into a single frame in a fusion 214, thereby providing a fused frame 212. The frames may be combined so that predetermined regions of a scene are reserved for a specific modality of perception data. With reference to FIG. 4, an exemplary frame of fused perception data 400 is illustrated. The frame of fused perception data 400 includes a predetermined pattern of regions that are dedicated to only one modality of perception data. Accordingly, there is a visible region 402 reserved for visible perception data, a first RADAR/LiDAR region 408 on one lateral side and a second RADAR/LiDAR region 404 on an opposite lateral side. An SWIR region 410 is centrally located in the frame of fused perception data 400 and an LWIR region 406 is located in a lower part of the frame of fused perception data 400. Returning to FIG. 3, the multiplexing 223 and fusion 214 steps result in spatially aligned frames of grayscale perception data corresponding to each type of perception data and only a spatially restricted part of each type of data is taken to construct the fused frame 212. The fused frame is a coherent 2D grayscale image with different regions being made up of different types of perception data. The pattern of regions shown in FIG. 4 is an example of suitable use of the different types of perception data that takes advantage of the strengths of each type of perception data.

Once the fused frame 212 has been generated, a determination as to whether the fused frame 212 is usable 209 is made. A repetitive constant change in contrast, SNR, luminance and/or number of edges may determine the usability of the fused frame 208. If the usability score is sufficiently high, the fused frame 212 is taken as the final fused frame 210 and sent to a trained neural network 206 for object detection and localization. The detected objects found by the trained neural network 206 are tracked and used as an input for a control algorithm (included within the vehicle control system 80) to control various vehicle features including steering, propulsion and/or braking. In order to facilitate object detection by the trained neural network 206, a step to add metainformation 218 may be included such that metainformation is sent to the neural network 206 along with the metainformation. Exemplary metainformation includes, but is not limited to, pixel size, pixel location, sensor temperature, object distance, object characteristics, horizontal pixels, vertical pixels.

Figure 5:
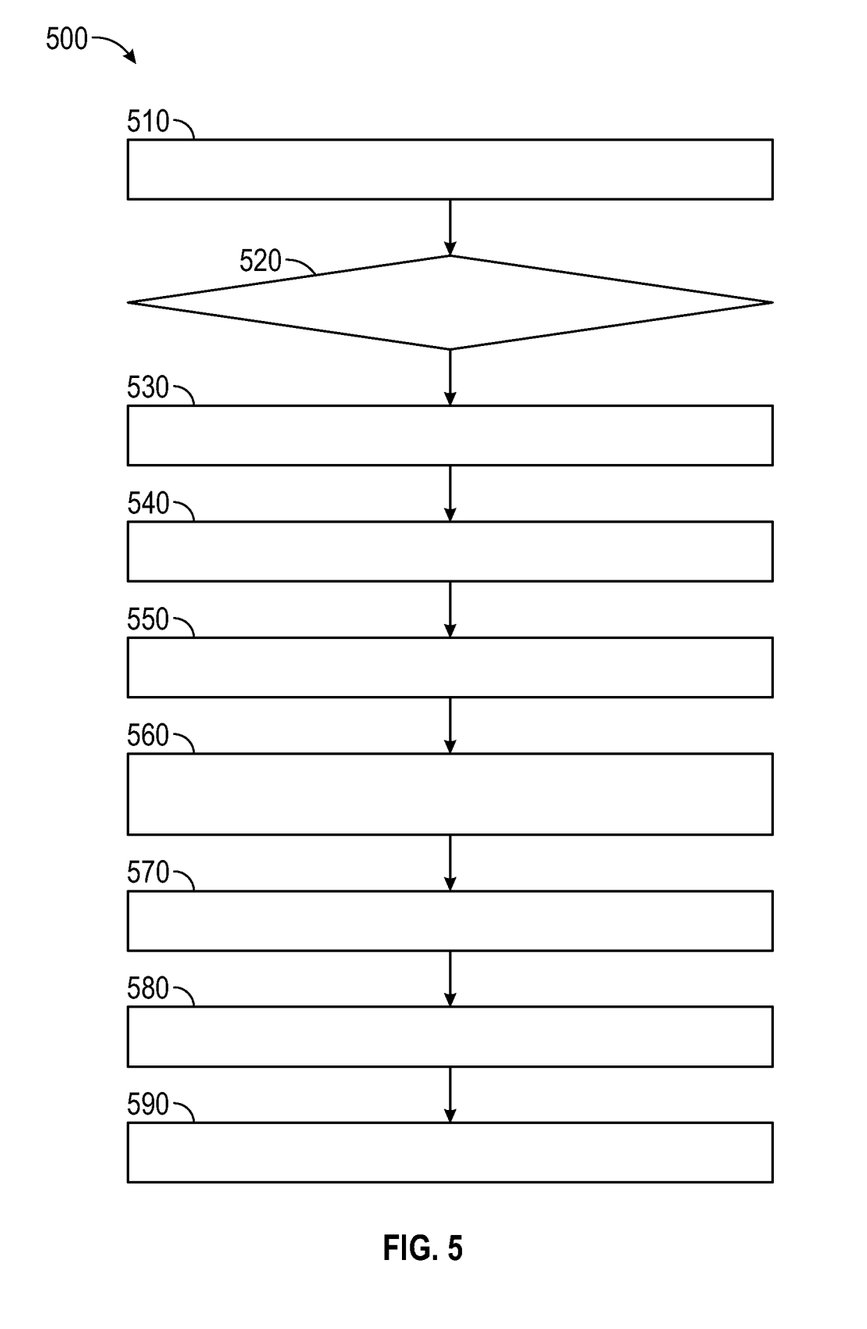
FIG. 5 is a flowchart illustrating a control method for controlling a vehicle, in accordance with various embodiments.

Referring now to FIG. 5, and with continued reference to FIGS. 1-4, a flowchart illustrates a control method 500 that can be performed by the vehicle system 100 of FIG. 1, particularly by the fused frame perception system 200 of FIG. 3 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the method 500 can be scheduled to run based on one or more predetermined events, and/or can run continuously during operation of the vehicle 10.

Method 500 includes step 510 of receiving a visible frame 230 of perception data. The visible frame 230 is received from one or more cameras 202 of the vehicle 10. In step 520, a determination is made as to whether the visible frame 230 is usable. That is, whether the visible frame is of sufficient quality according to a determined usability score to use just the visible frame 230 for detecting objects without combining the visible frame 230 with other frames of data from invisible imaging modalities. The usability score may take into account various parameters that are apparent from the visible frame 230 itself including a repetitive constant change in contrast within the visible frame 230, SNR, luminance, number of edges, etc. The number of edges may be determined by performed edge detection processing and counting the number of edges. When the usability score is low (per a calibrated threshold), other sensor modalities are triggered (per step 530) and the remaining part of method 500 commences. When the usability score is high, object detection is performed on the visible frame 230 without fusing with other modalities of perception data and an automated vehicle control function is performed using detected objects from the visible frame 230.

In step 540, further frames of perception data are received from other perception sensor modalities. As described previously, at least one of the following further sensor modalities provides frames of perception data for fusing with the visible frame 230: IR sensor (e.g. SWIR and/or LWIR) 232, 236, LiDAR sensor 240 and/or RADAR sensor 242. The received further frames of perception data are aligned with the visible frame 230 (per step 550) using information extracted from spatially overlapping regions of the various frames of perception data. As described herein, the extracted information can be determined by edge detection and/or object detection and feature matching processes. The object detection may be blob detection so that the extracted information is obtained by relatively low processing requirement image processing techniques. Since all frames of each type of sensor modality have been converted into 2D grayscale images (as described with reference to FIG. 3), the edge detection and object detection can be performed efficiently. In fact, the grayscale images may be binarized to allow for efficient object detection.

In step 560, regions of interest are extracted from each type of perception data in the aligned frames of perception data and, in step 570, the extracted regions are combined into a fused frame 212. The regions of interest may be taken from predetermined locations as illustrated in FIG. 4 so that regions are selected where certain modalities perform well in terms of quality of perception data and allowing object detection. Accordingly, the fused frame 212 is a coherent 2D grayscale image with different regions derived from different modalities of perception data. The spatial arrangement of these regions in the fused frame 212 may be predetermined. A determination may be made as to whether the fused frame 212 is usable based on a usability score that can be determined as described previously herein. Assuming the fused frame 212 is sufficiently usable, the final fused frame 210 is sent to the neural network 206 for object detection. If the final fused frame 210 is not sufficiently usable, the method 500 can begin again with a next set of frames.

In step 580, object detection, classification, localization and tracking is performed using the neural network 206. In step 590 an automated vehicle control function is performed using detected objects. In particular, the output object detection data is provided to the vehicle control system 80 executing one or more automated vehicle control functions based on the detected objects as input data. The vehicle control system 80 responsively commands the actuator system 30 to control the vehicle 10, particularly steering, braking and/or propulsion commands to follow a path determined based on the detected objects.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
   receiving, via at least one processor, a frame of visible image data from at least one camera of the vehicle that is incorporated into the vehicle;
   receiving, via the at least one processor, a frame of invisible perception data from at least one perception sensor that is incorporated into the vehicle;
   fusing, via the at least one processor, the frame of invisible perception data and the frame of visible image data to provide a fused frame of perception data;
   performing, via the at least one processor, object detection, classification and tracking using a machine learning algorithm via a neural network based on the fused frame of perception data to provide object detection data;
   determining, via the at least one processor, a usability score for the frame of visible image data, based on each of the following: a repetitive constant change in contrast within the frame of the visible image data, a luminance of the frame of the visible image data, a signal to noise ratio of the frame of the visible image data, and a number of edges of the frame of the visible image data;
   performing, via the at least one processor, the object detection, classification and tracking using the machine learning algorithm based on the fused frame of perception data when the usability score is less than a predetermined value and based on the frame of visible image data when the usability score is greater than the predetermined value; and
   controlling, via the at least one processor, steering, propulsion, and braking of the vehicle based on the object detection data, including based on the object detection, classification and tracking using the machine learning algorithm based on the fused frame of perception data when the usability score is less than a predetermined value and based on the frame of visible image data when the usability score is greater than the predetermined value.

2. The method of claim 1, further comprising aligning, via the at least one processor, the frame of invisible perception data and the frame of visible image data to provide aligned frames that are fused into the fused frame of perception data, wherein the aligning, via the at least one processor, comprises both:
   detecting objects in the frame of invisible perception data and in the frame of visible image data and aligning the objects; and
   detecting the edges in the frame of invisible perception data and in the frame of visible image data and aligning the edges.

3. The method of claim 1, comprising receiving, via the at least one processor, the frame of invisible perception data from each of a LiDAR sensor, a RADAR sensor, and an infrared perception sensor.

4. The method of claim 1, comprising receiving, via the at least one processor, the frame of invisible perception data from a first type of perception sensor; receiving, via the at least one processor, a second frame of invisible perception data from another type of perception sensor; and fusing, via the at least one processor, the frame of invisible perception data, the second frame of invisible perception data and the frame of visible image data to provide the fused frame of perception data, wherein the first type of perception sensor and the second type of perception sensor are selected from a combination of: a short wave infrared perception sensor, a long wave infrared perception sensor, LiDAR and Radar.

5. The method of claim 1, wherein:
   the at least one perception sensor comprises a LIDAR sensor configured to obtain LIDAR sensor data and a RADAR sensor configured to obtain RADAR sensor data; and
   the method further comprises:
   generating a LIDAR point cloud from the LIDAR sensor data;
   generating a RADAR point cloud from the RADAR sensor data;
   performing a two dimensional conversion of both the LIDAR point cloud and the RADAR point cloud utilizing a camera model and projection processing to project each cloud point of both the LIDAR point cloud and the RADAR point cloud onto a two dimensional plane; and stitching, via the at least one processor, respective frames of the LIDAR point cloud and the RADAR point cloud together via a fusion process.

6. The method of claim 1, further comprising:
performing, via the at least one processor, scanning for objects in each different type of image frame using blob detection; and
aligning, via the at least one processor, each of the different types of the image frames via the objects that are identified using the blob detection.

7. The method of claim 6, wherein the blob detection is performed via the processor by binarizing grayscale image frames and determine object blobs using a Laplacian method.

8. The method of claim 6, wherein the blob detection is performed via the processor by binarizing grayscale image frames and determine object blobs using a Gaussian method.

9. The method of claim 6, wherein the aligning step includes an extraction of edges from grayscale images in each sensing modality for creating the aligned fames; and the extracted edges are utilized via the at least one processor for feature matched alignment in multiplexing and overlaying edges of the image frames.

10. The method of claim 9, further comprising:
providing spatially aligned frames of perception data; and
combining the spatially aligned frames of perception data into a single frame via fusion performed by the at least one processor, in a manner that the frames are combined such that predetermined regions of a scene are reserved specifically for a specific modality of perception data, wherein the frame of fused perception data includes a predetermined pattern of regions that are dedicated to only one modality of perception data.

11. The method of claim 10, wherein the frame of used perception data includes visible region reserved for visible perception data, a RADAR region on one lateral side, a LiDAR region on an opposite lateral side, a short wave infrared (SWIR) region that is centrally located in the frame of fused perception data, and a long wave infrared (LWIR) region that is located in a lower part of the frame of fused perception data, such that multiplexing and fusion steps result in spatially aligned frames of grayscale perception data corresponding to each type of perception data and only a spatially restricted part of each type of data is taken to construct the fused frame, and wherein the fused frame comprises a two dimensional grayscale image with different regions being made up of different types of perception data.

12. A vehicle system for a vehicle, the system comprising:
at least one camera that is incorporated into the vehicle;
at least one perception sensor that is incorporated into the vehicle; and
at least one processor in operable communication with the camera and the perception sensor, the at least one processor configured to execute program instructions, wherein the program instructions are configured to cause the at least one processor to:
receive a frame of visible image data from the at least one camera;
receive a frame of invisible perception data from a perception sensor;
fuse the frame of invisible perception data and the frame of visible image data to provide a fused frame of perception data;
perform object detection, classification and tracking using a machine learning algorithm via a neural network based on the fused frame of perception data to provide object detection data;
determine a usability score for the frame of visible image data, based on each of the following: a repetitive constant change in contrast within the frame of the visible image data, a luminance of the frame of the visible image data, a signal to noise ratio of the frame of the visible image data, and a number of edges of the frame of the visible image data;
perform the object detection, classification and tracking using the machine learning algorithm based on the fused frame of perception data when the usability score is less than a predetermined value and based on the frame of visible image data when the usability score is greater than the predetermined value; and
control steering, propulsion, and braking of the vehicle based on the object detection data, including based on the object detection, classification and tracking using the machine learning algorithm based on the fused frame of perception data when the usability score is less than a predetermined value and based on the frame of visible image data when the usability score is greater than the predetermined value.

13. The vehicle system of claim 12, wherein the program instructions are further configured to cause the at least one processor to: align the frame of invisible perception data and the frame of visible image data to provide aligned frames that are fused into the fused frame of perception data, wherein the aligning, via the at least one processor, comprises both:
detecting objects in the frame of invisible perception data and in the frame of visible image data and aligning the objects; and
detecting the edges in the frame of invisible perception data and in the frame of visible image data and aligning the edges.

14. The vehicle system of claim 12, wherein:
the at least one perception sensor comprises a LIDAR sensor configured to obtain LIDAR sensor data and a RADAR sensor configured to obtain RADAR sensor data; and
the at least one processor is further configured to:
generate a LIDAR point cloud from the LIDAR sensor data;
generate a RADAR point cloud from the RADAR sensor data;
perform a two dimensional conversion of both the LIDAR point cloud and the RADAR point cloud utilizing a camera model and projection processing to project each cloud point of both the LIDAR point cloud and the RADAR point cloud onto a two dimensional plane; and
stitch respective frames of the LIDAR point cloud and the RADAR point cloud together via a fusion process.

15. The vehicle system of claim 12, wherein the processor is further configured to:
perform scanning for objects in each different type of image frame using blob detection; and
align each of the different types of the image frames via the objects that are identified using the blob detection.

16. The vehicle system of claim 15, wherein the processor is further configured to: perform the blob detection by binarizing grayscale image frames and determine object blobs using a Laplacian vehicle system.

17. The vehicle system of claim 15, wherein the processor is further configured to: perform the blob detection by binarizing grayscale image frames and determine object blobs using a Gaussian vehicle system.

18. The vehicle system of claim 15, wherein the processor is further configured to performing the aligning using an extraction of edges from grayscale images in each sensing modality for creating the aligned fames; and utilizing the extracted edges for feature matched alignment in multiplexing and overlaying edges of the image frames.

19. The vehicle system of claim 18, wherein the processor is further configured to:
provide spatially aligned frames of perception data; and
combine the spatially aligned frames of perception data into a single frame via fusion performed by the at least one processor, in a manner that the frames are combined such that predetermined regions of a scene are reserved specifically for a specific modality of perception data, wherein the frame of fused perception data includes a predetermined pattern of regions that are dedicated to only one modality of perception data.

20. The vehicle system of claim 19, wherein the frame of used perception data includes visible region reserved for visible perception data, a RADAR region on one lateral side, a LiDAR region on an opposite lateral side, a short wave infrared (SWIR) region that is centrally located in the frame of fused perception data, and a long wave infrared (LWIR) region that is located in a lower part of the frame of fused perception data, such that multiplexing and fusion steps result in spatially aligned frames of grayscale perception data corresponding to each type of perception data and only a spatially restricted part of each type of data is taken to construct the fused frame, and wherein the fused frame comprises a two dimensional grayscale image with different regions being made up of different types of perception data.

* * * * *